United States Patent
Harada et al.

(10) Patent No.: US 11,929,701 B2
(45) Date of Patent: Mar. 12, 2024

(54) ELECTRONIC APPARATUS, CONTROL METHOD OF ELECTRONIC APPARATUS AND STORAGE MEDIUM

(71) Applicant: CANON KABUSHIKI KAISHA, Tokyo (JP)

(72) Inventors: Keiji Harada, Yokohama (JP); Masayuki Hongo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/394,095

(22) Filed: Apr. 25, 2019

(65) Prior Publication Data
US 2019/0334461 A1   Oct. 31, 2019

(30) Foreign Application Priority Data
Apr. 27, 2018  (JP) ................. 2018-086567

(51) Int. Cl.
*H02P 7/292* (2016.01)
*B41J 2/045* (2006.01)
*H02P 7/29* (2016.01)

(52) U.S. Cl.
CPC .......... *H02P 7/292* (2013.01); *B41J 2/04541* (2013.01); *B41J 2/04586* (2013.01); *H02P 7/29* (2013.01)

(58) Field of Classification Search
CPC ............... B41J 2/04541; B41J 2/04548; B41J 2/04586; H02P 29/025; H02P 7/04; H02P 7/29; H02P 7/292
USPC .................................................. 318/400.29
See application file for complete search history.

(56) References Cited

U.S. PATENT DOCUMENTS

| 7,175,249 B2 | 2/2007 | Hongo et al. |
| 7,271,554 B2 * | 9/2007 | Aizawa .................... B41J 29/38 318/34 |
| 7,508,161 B2 | 3/2009 | Harada |

(Continued)

FOREIGN PATENT DOCUMENTS

| JP | 2006-262628 A | 9/2006 |
| JP | 2007-097388 A | 4/2007 |

(Continued)

OTHER PUBLICATIONS

Mar. 22, 2022 Office Action in Japanese Patent Application No. 2018-086567 (with English translation).

*Primary Examiner* — Kawing Chan
(74) *Attorney, Agent, or Firm* — Venable LLP

(57) ABSTRACT

The electronic apparatus including a DC motor that is driven based on a current supplied from a power source, and including: a detection circuit that detects an instantaneous interruption of the power source; an H bridge circuit having an upper arm circuit having two switching elements connected in parallel to the power source and a lower arm circuit having two switching elements connected in parallel to a ground, the upper arm circuit and the lower arm circuit being connected in series, and controlling a current to be supplied to the DC motor; and a switching control circuit that controls the switching element, and in a case where an instantaneous interruption of the power source is detected by the detection circuit, the switching control circuit sets the switching elements of the upper arm circuit to off and sets the switching elements of the lower arm circuit to on.

16 Claims, 7 Drawing Sheets

(56) References Cited

U.S. PATENT DOCUMENTS

| | | | |
|---|---|---|---|
| 7,538,502 B2 * | 5/2009 | Hongo | B41J 11/42 |
| | | | 318/700 |
| 7,780,257 B2 | 8/2010 | Hongo et al. | |
| 9,195,287 B2 | 11/2015 | Harada | |
| 2009/0261764 A1 * | 10/2009 | Hirata | H02P 6/26 |
| | | | 318/400.29 |
| 2010/0127652 A1 * | 5/2010 | Morita | H02P 27/08 |
| | | | 318/400.27 |
| 2014/0070752 A1 | 3/2014 | Otsuji et al. | |
| 2016/0098041 A1 * | 4/2016 | Otsuji | G05B 19/19 |
| | | | 318/601 |
| 2019/0226263 A1 * | 7/2019 | Kishino | B60J 5/10 |
| 2020/0313579 A1 * | 10/2020 | Vergani | H02P 3/12 |

FOREIGN PATENT DOCUMENTS

| | | |
|---|---|---|
| JP | 2012-039847 A | 2/2012 |
| JP | 2014-192919 A | 10/2016 |

* cited by examiner 5B-3

5B-2

5B-1

ELECTRONIC APPARATUS, CONTROL METHOD OF ELECTRONIC APPARATUS AND STORAGE MEDIUM

BACKGROUND OF THE INVENTION

Field of the Invention

The present invention relates to an electronic apparatus, a control method of an electronic apparatus, and a storage medium.

Description of the Related Art

Conventionally, there is an electronic apparatus mounting a DC (Direct Current) motor using an AC (Alternating Current) power source. However, in the electronic apparatus such as this, in a case where the power source voltage falls due to an AC instantaneous interruption, servo control is performed so as to compensate for a fall in torque due to a fall in the motor drive voltage, and therefore, the power source voltage further falls, and as a result, there is a case where the electronic apparatus shuts down.

Consequently, for example, Japanese Patent Laid-Open No. 2012-39847 has proposed a motor control device that varies the position command for controlling a motor in order to avoid a stop of the motor that causes an electronic apparatus (robot) to operate in a case where the occurrence of an AC instantaneous interruption is detected.

However, with the technique of Japanese Patent Laid-Open No. 2012-39847, in a case where an AC instantaneous interruption is detected, the rotation speed of the motor is reduced by changing the position command for controlling the motor, and therefore, it is not possible to continue the normal motor operation.

Consequently, an object of the present invention is to continue the normal motor operation as long as possible while suppressing a fall in the power source voltage at the time of AC instantaneous interruption.

SUMMARY OF THE INVENTION

The present invention is an electronic apparatus including a DC motor that is driven based on a current supplied from a power source, the electronic apparatus including: a detection circuit that detects an instantaneous interruption of the power source; an H bridge circuit having an upper arm circuit having two switching elements connected in parallel to the power source and a lower arm circuit having two switching elements connected in parallel to a ground, the upper arm circuit and the lower arm circuit being connected in series, and controlling a current to be supplied to the DC motor; and a switching control circuit that controls the switching element, and in a case where an instantaneous interruption of the power source is detected by the detection circuit, the switching control circuit sets the switching elements of the upper arm circuit to off and sets the switching elements of the lower arm circuit to on.

Further features of the present invention will become apparent from the following description of exemplary embodiments with reference to the attached drawings.

DESCRIPTION OF THE EMBODIMENTS

In the following, with reference to the drawings, an electronic apparatus according to an embodiment of the present invention is explained. The following embodiment is not intended to limit the present invention and all combinations of features explained in the present embodiment are not necessarily indispensable to the solution of the present invention.

Figure 1:
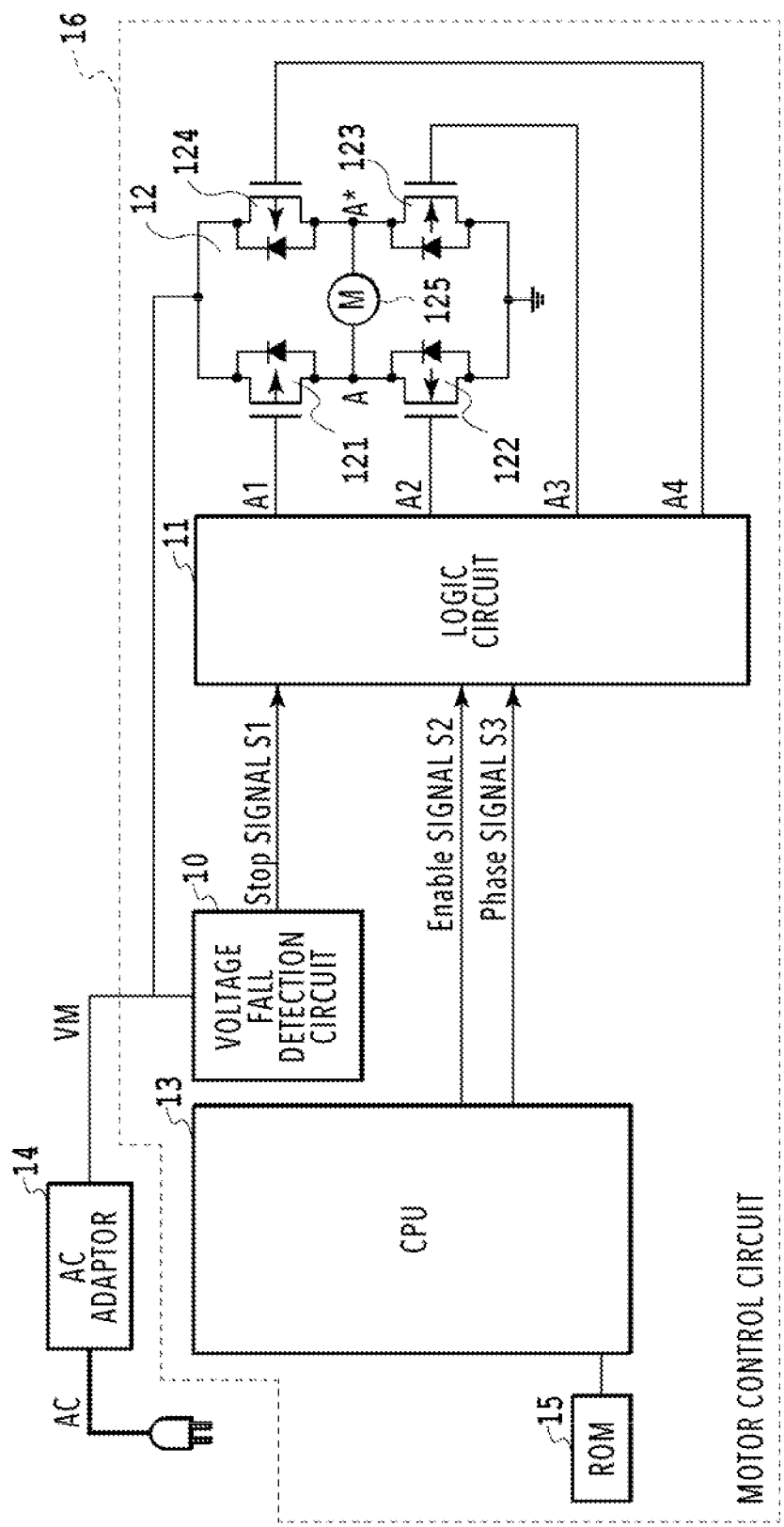
FIG. 1 is a hardware configuration diagram of an electronic apparatus.

FIG. 1 is a hardware configuration diagram of an electronic apparatus according the embodiment of the present invention. The electronic apparatus mainly includes a motor control circuit 16 and an AC adaptor 14 that generates a DC power source VM (here, 32 V is supposed as one example) for the motor control circuit 16.

The motor control circuit 16 includes a voltage fall detection circuit 10, a logic circuit 11, an H bridge circuit 12, a CPU 13, and a ROM 15. In a case where the voltage of the DC power source VM becomes lower than a predetermined voltage (for example, becomes lower than 25 V) at least while a DC motor 125 is driving, the voltage fall detection circuit 10 detects this as an AC power source instantaneous interruption (shutoff) and asserts a Stop signal S1.

The CPU 13 sends out an Enable signal S2 and a Phase signal S3 to the logic circuit 11 based on firmware written to the ROM 15 and controls the drive of the DC motor 125.

The logic circuit 11 is a switching control circuit and controls on or off of four switching elements (hereinafter, referred to as switches) 121 to 124 of the H bridge circuit 12 based on the signals sent out from the voltage fall detection circuit 10 and the CPU 13.

The H bridge circuit 12 is mainly configured by serially connecting an upper arm circuit having the switches 121 and 124 connected in parallel to the DC power source VM and a lower arm circuit having the switches 122 and 123 connected in parallel to the ground. Further, each of the switches 121 to 124 has a transistor with which a diode is connected in parallel.

The DC motor 125 is driven based on a current supplied from the DC power source VM. Here, by using the timing chart in FIG. 2A and the diagrams showing the state of each switch in the H bridge circuit 12 in FIG. 2B, supplementary explanation is given to the control method of the DC motor 125.

First, between time T0 and time T1, the Enable signal S2 is at Low, and therefore, all the switches 121 to 124 are off and no current flows through the DC motor 125. That is, the amount of a current I1 that flows through the DC motor 125 is zero. Further, the on state or the off state of each switch in the H bridge circuit 12 between time 0 and time T1 is shown by symbol 2B-1. In symbol 2B-1, "○" indicates the on state of the switch and "×" indicates the off state of the switch. This is also the same with symbol 2B-2 to symbol 2B-4.

Next, between T1 and T2, the Enable signal S2 is at High and the Phase signal S3 is at Low, and therefore, the logic circuit 11 performs control so as to keep the switches 121 and 123 in the off state and to switch the switches 122 and 124 to the on state. Between time T1 and time T2, as indicated by symbol 2B-2, the motor current I1 flows through a path indicated by a broken line in a direction of a broken-line arrow.

Figure 2A:
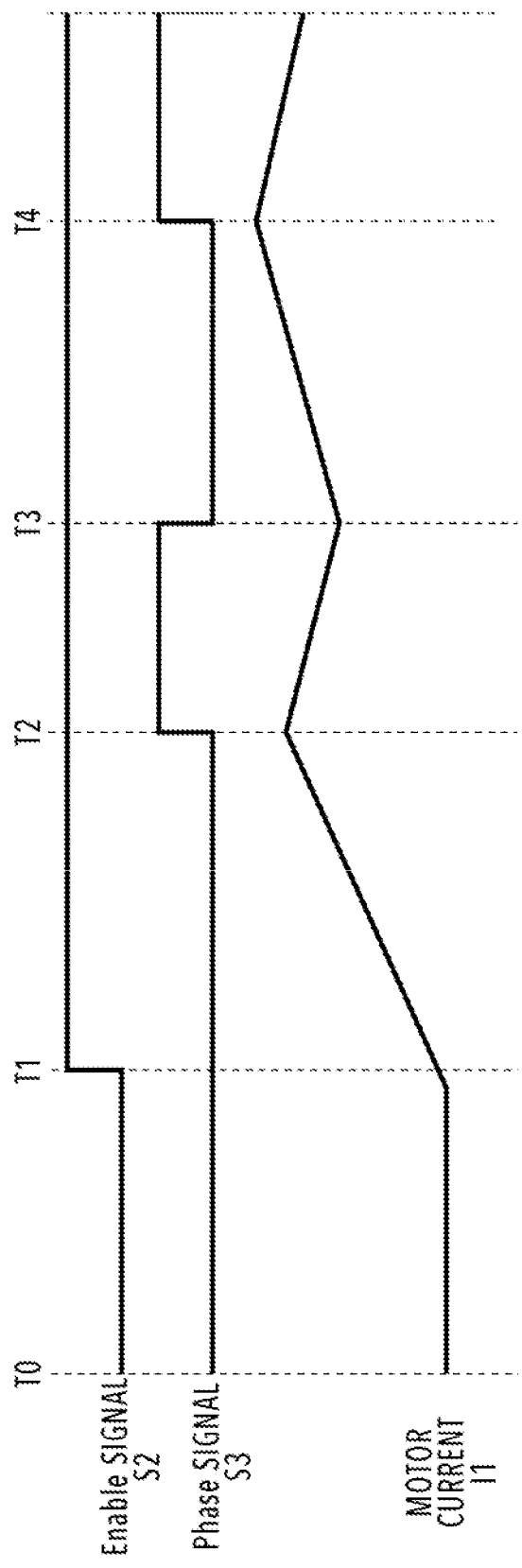
FIG. 2A is a diagram showing a timing chart.
Figure 2B:
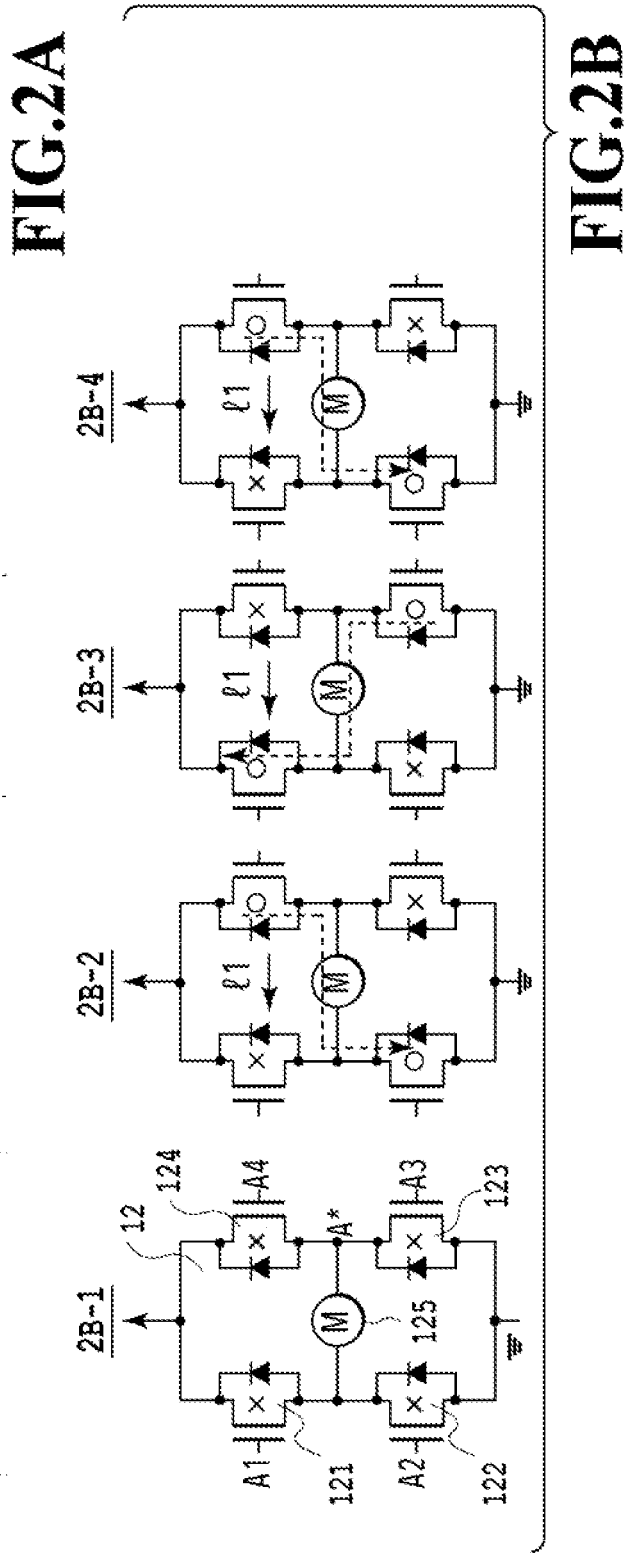
FIG. 2B is a diagram showing a state of each switch in an H bridge circuit.

Then, between time T2 and time T3, the Phase signal S3 is switched from Low to High in the state where the Enable signal S2 is kept at High, and therefore, the on or off states of all the switches of the H bridge circuit 12 are reversed. Between time T2 and time T3, the motor current I1 flows from the GND to the power source via the DC motor 125 although the amount of the current is reduced as shown in FIG. 2A and indicated by symbol 2B-3. Here, the reason the amount of the motor current I1 is reduced is that the supply of the DC power source VM no longer contributes and the motor current flows (is generated) only by the energy accumulated in an inductor.

Further, between time T3 and time T4, the Phase signal S3 is switched again from High to Low in the state where the Enable signal S2 is kept at High. Because of this, the states of all the switches of the H bridge circuit 12 enter the same states between time T1 and time T2 as indicated by symbol 2B-4, and therefore, the motor current I1 increases again in relation to the supply of the DC power source VM as shown in FIG. 2A. As above, by sending out the Enable signal S2 and the Phase signal S3 to the logic circuit 11, the CPU 13 controls the switches 121 to 124 of the H bridge circuit 12 and adjusts the direction and amount of the current flowing through the DC motor 125.

Figure 3A:
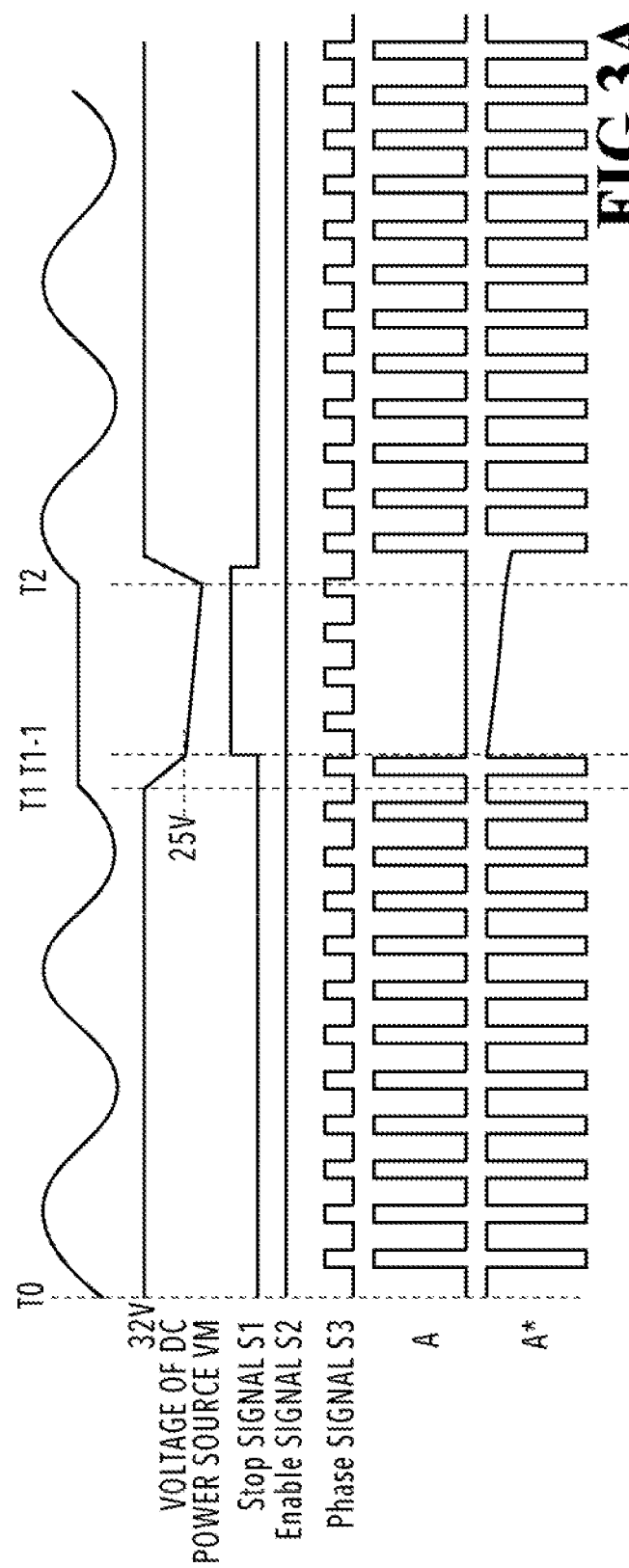
FIG. 3A is a diagram showing a timing chart.
Figure 3B:
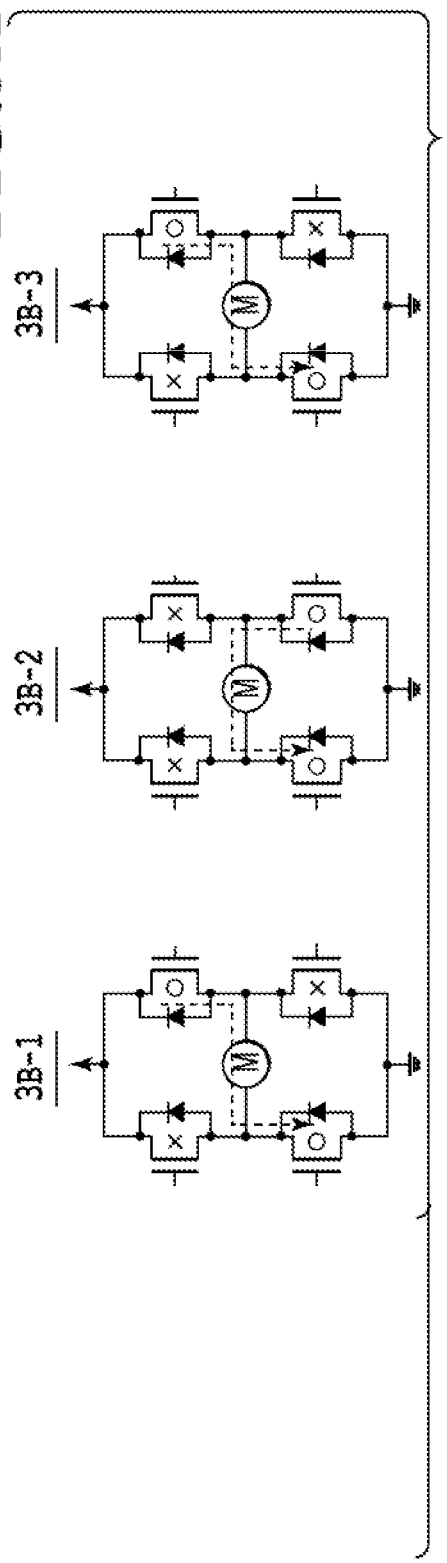
FIG. 3B is a diagram showing a state of each switch in the H bridge circuit.

Next, by using the timing chart in FIG. 3A and the diagrams showing the state of each switch in the H bridge circuit 12 in FIG. 3B, the operation of the electronic apparatus at the time of occurrence of an AC instantaneous interruption is explained. First, between time T0 and time T1, the AC power source is supplied normally to the AC adaptor 14 and the AC adaptor 14 outputs a constant voltage of 32 V as the DC power source VM. Because of this, the Stop signal S1 that is output from the voltage fall detection circuit 10 is controlled so as to be at Low. That is, the Stop signal S1 is negated.

Further, between time T0 and time T1, the CPU 13 causes a constant current to flow through the DC motor 125 by controlling the Enable signal S2 so as to become High and performing PWM (Pulse Width Modulation) control for the Phase signal S3. In FIG. 3B, as the switch state of the H bridge circuit 12, as in FIG. 2B, "○" indicates the on state of the switch and "×" indicates the off state of the switch and a broken line indicates the path and the direction of a current that flows through the DC motor 125.

Next, between time T1 and time T2, in a case where the AC power source stops, as shown in FIG. 3A, the voltage of the DC power source VM begins to fall suddenly. Then, in a case where the voltage of the DC power source VM becomes lower than 25 V, the voltage fall detection circuit 10 detects this and turns the Stop signal S1 to High. That is, the voltage fall detection circuit 10 asserts the Stop signal S1. Due to this, the logic circuit 11 controls (sets) the upper switches 121 and 124 of the H bridge circuit 12 to off and the lower switches 122 and 123 to on irrespective the level of the Phase signal S3 as indicated by symbol 3B-2.

As a result of this, the AC adaptor 14 and the H bridge circuit 12 are separated from each other and the consumed current of the DC power source VM is reduced significantly and the speed of the fall in voltage of the DC power source VM slows down, and on the other side, the motor current I1 is efficiently regenerated with a low loss via the lower switches 123 and 122. Due to this, it is possible to rotate the motor as long as possible by using the energy remaining in the inductor of the motor. Between time T1-1 and time T2, the logic circuit 11 controls (fixes) the upper switches 121 and 124 of the H bridge circuit 12 to off and the lower switches 122 and 123 to on.

Then, after time T2, in a case where the state returns to the normal state from the state where the AC power source is interrupted instantaneously, the voltage of the DC power source VM recovers rapidly to 32 V. Because of this, the voltage fall detection circuit 10 controls the Stop signal S1 to Low. That is, the voltage fall detection circuit 10 negates the Stop signal S1. Due to this, the logic circuit 11 performs PWM control for the H bridge circuit 12 based on the level of the Phase signal S3 as between time T0 and time T1.

As above, the electronic apparatus according to the present embodiment is explained and in the following, in order to explain the effect of the present invention, two kinds of operation are shown separately in a case where the configuration of the present invention is not implemented (the function is not applied) in an electronic apparatus.

Figure 4:
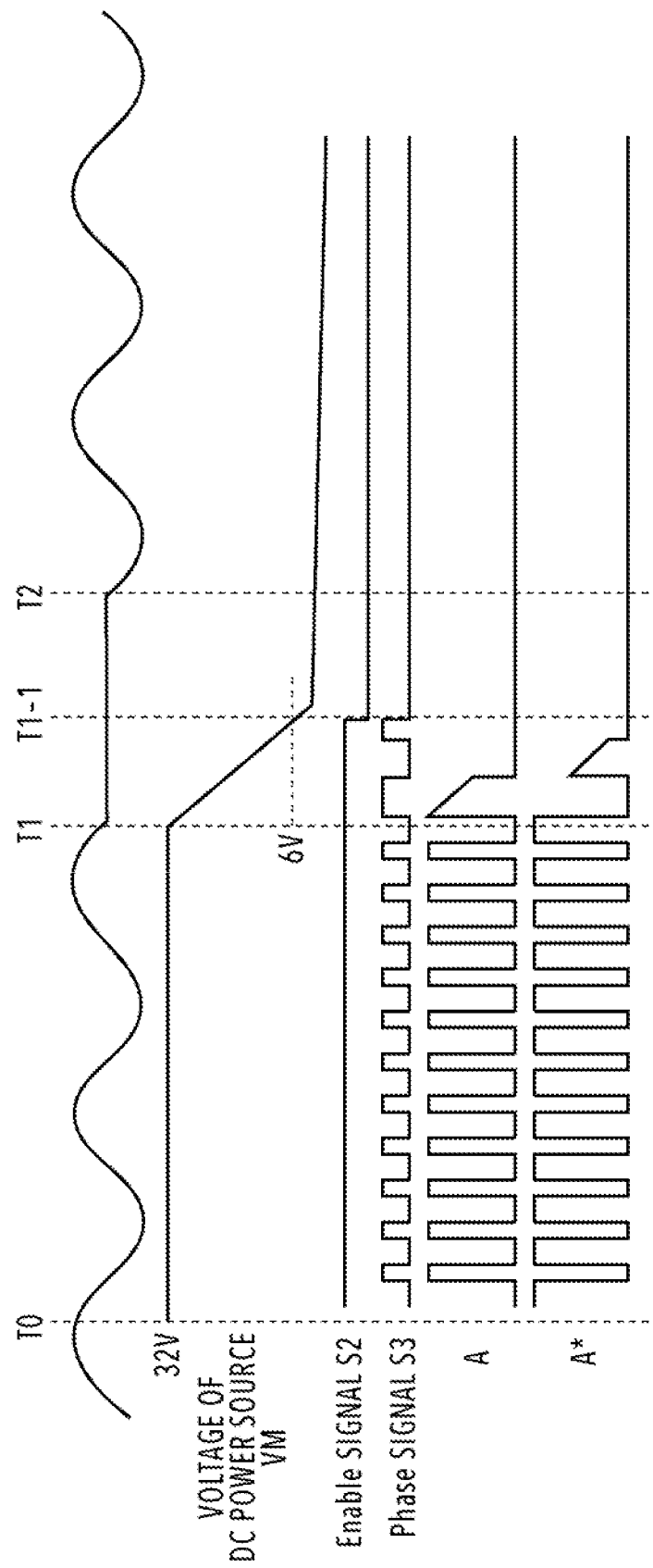
FIG. 4 is a diagram for explaining an operation in a case where a voltage fall detection circuit is not implemented.

First, a case where the voltage fall detection circuit 10 is not implemented is shown in FIG. 4. In this case, first, between time T0 and time T1, the state is the same as that in FIG. 3A and FIG. 3B described above. Next, in a case where the AC power source is interrupted instantaneously between time T1 and time T2, the voltage of the DC power source VM falls suddenly. At this time, the CPU 13 detects a fall in the torque in the DC motor 125 by, for example, a unit (not shown schematically) configured to feed back the motor operation of the encoder and the like, and further, tries to increase the motor current by widening the PWM width in order to compensate for a torque shortage. Because of this, as shown at time T1-1 in FIG. 4, the voltage of the DC power source VM further falls to 6 V and becomes lower than 6 V, and therefore, the electronic apparatus shuts down because of the voltage shortage.

Figure 5A:
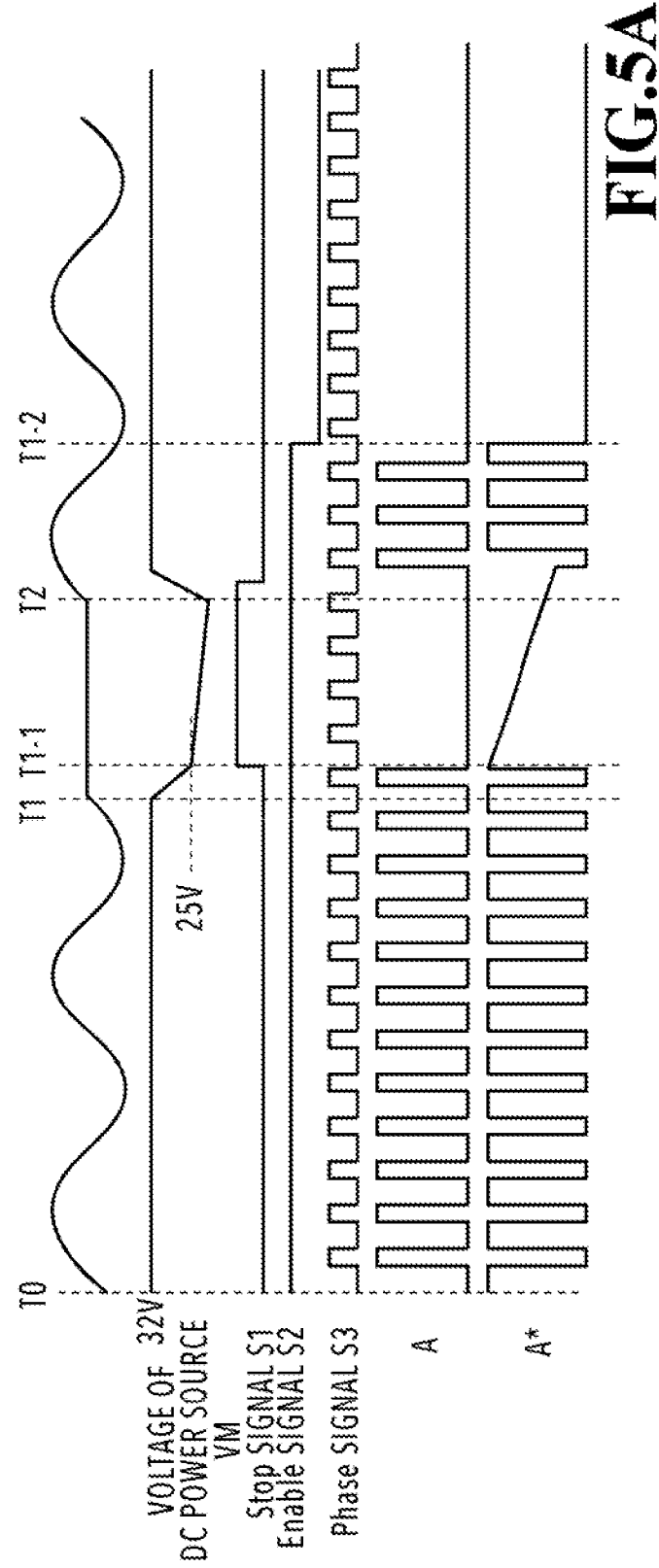
FIG. 5A is a diagram showing a timing chart.
Figure 5B:
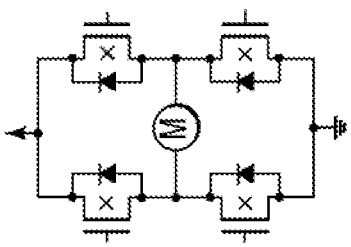
FIG. 5B is a diagram showing a state of each switch in the H bridge circuit.
Figure 5B:
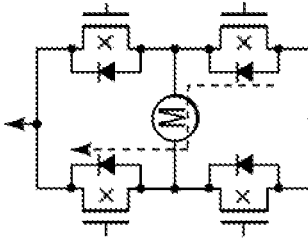
Figure 5B:
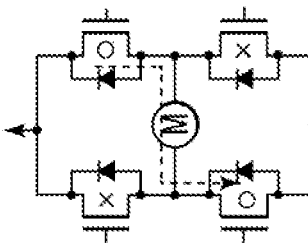

Second, a case where all the switches 121 to 124 in the H bridge circuit 12 are turned off at the time of the Stop signal S1 being controlled to High (being asserted) is shown in FIG. 5A and FIG. 5B. FIG. 5A is a timing chart and FIG. 5B is diagrams showing the state of each switch in the H bridge circuit 12. In this case, between time T0 and time T1 and between time T1 and the time at which the Stop signal S1 is controlled to High, the state is the same as that in FIG. 3A and FIG. 3B described above. Next, as indicated by symbol 5B-2, the logic circuit 11 turns off all the switches 121 to 124 in the H bridge circuit 12 irrespective of the level of the Phase signal S3.

As a result of this, the motor current continues to flow from the GND to the power source via the parasitic diode of the switch 123 and the parasitic diode of the switch 121, but the kinetic energy of the motor is consumed more by an amount corresponding to the loss of the two parasitic diodes whose on-voltage Vf is large. Because of this, it is no longer possible to keep the normal operation, such as that the motor speed is reduced significantly during the AC instantaneous interruption or that the motor stops.

Next, an example is explained in which the present invention is applied to a multi function ink jet printer (hereinafter, referred to as ink jet printer). First, the entire configuration of the ink jet printer is shown in FIG. 6A and FIG. 6B.

Figure 6A:
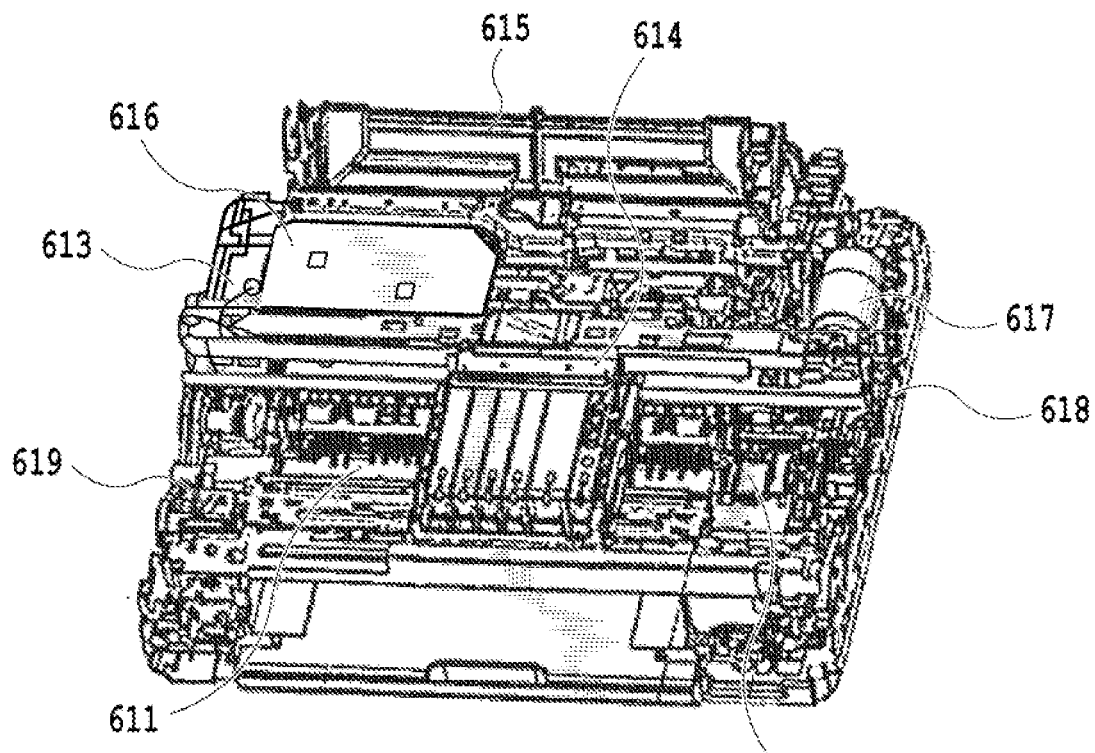
FIG. 6A is a diagram showing a printer unit.

FIG. 6A is a printer unit and the printer unit includes a CR motor 617, an APP motor 618, an LF motor 619, an AC adaptor 613, and a control substrate 616 including a motor control circuit 700 and controlling the entire printer. The motor control circuit 700 will be described later by using FIG. 7.

The CR motor 617 is a motor that drives a carriage 614 conveying a print head. The APP motor 618 is a motor that drives a cleaning mechanism 612 cleaning the nozzle of the print head and an automatic conveyance mechanism 615 taking out the uppermost medium from a plurality printed media and feeding the medium to a printer unit. The LF motor 619 is a motor that drives a conveyance mechanism 611 conveying the printed medium.

Figure 6B:
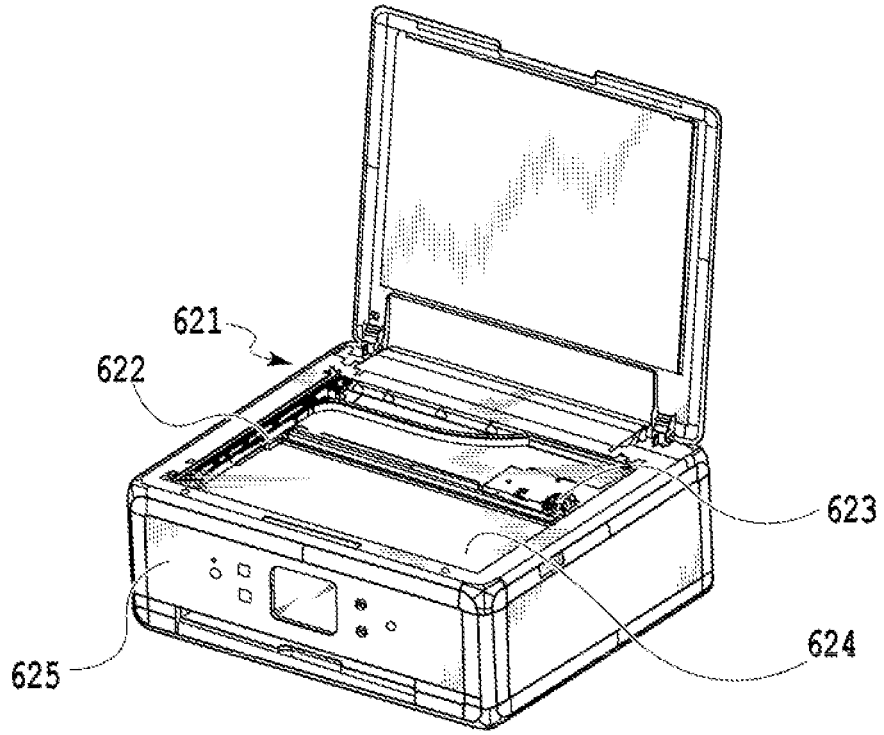
FIG. 6B is a diagram showing a state where an image reading unit and a panel unit are incorporated in the printer unit.

FIG. 6B shows a state where an image reading unit 621 and a panel unit 625 are incorporated in the printer unit in FIG. 6A. The image reading unit 621 includes an image reading sensor 622, an FB motor 623 that drives the image reading sensor 622, and a document table glass 624 that sets a document.

Figure 7:
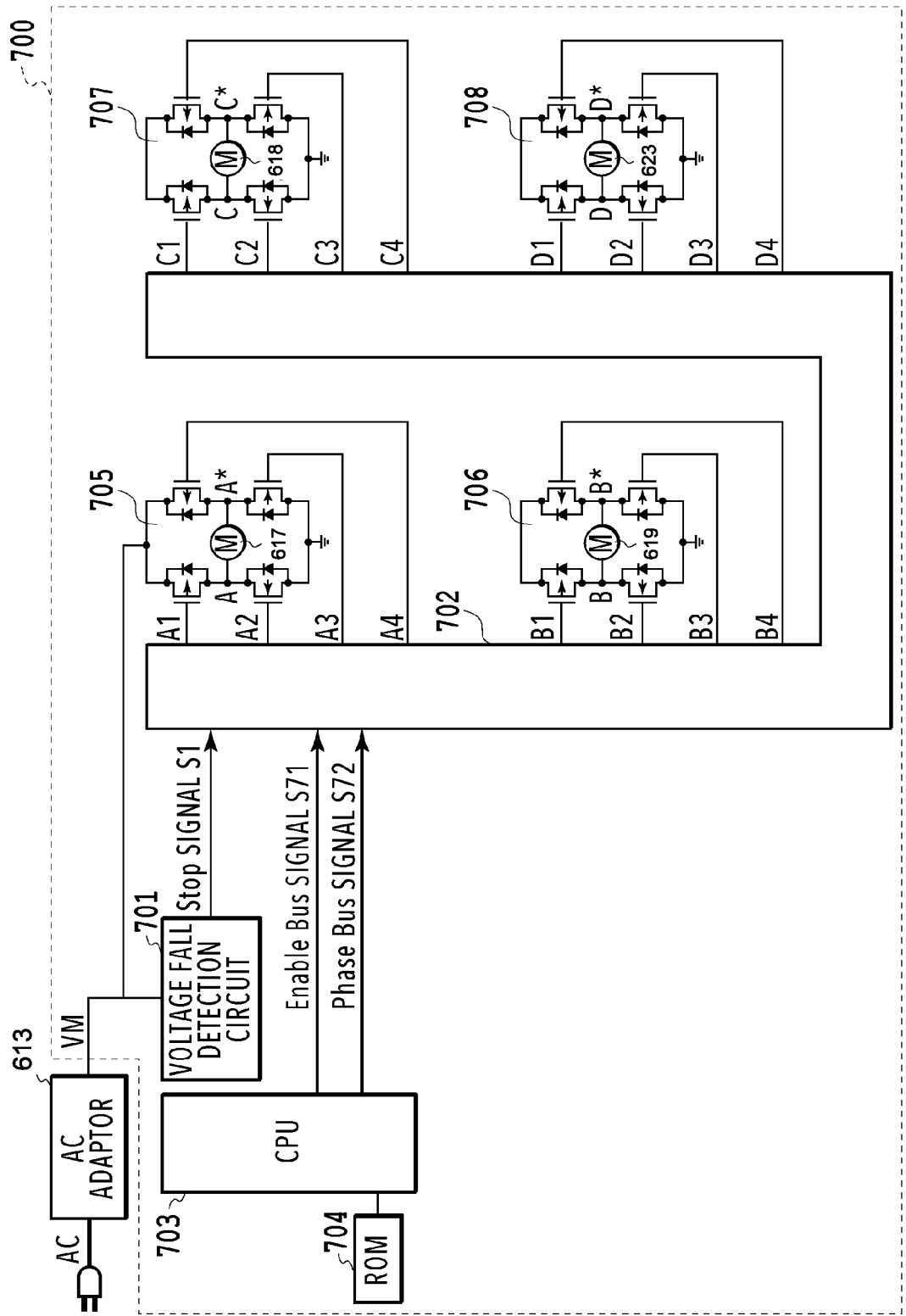
FIG. 7 is a hardware configuration diagram of an ink jet printer.

FIG. 7 is a hardware configuration diagram of an ink jet printer and details of the above-described motor control circuit 700 are explained by using FIG. 7. The motor control circuit 700 includes a voltage fall detection circuit 701, a logic circuit 702, a CPU 703, a ROM 704, and H bridge circuits 705 to 708.

In a case where, for example, the voltage of the DC power source VM becomes lower than 25 V, the voltage fall detection circuit 701 detects this and asserts the Stop signal S1. The CPU 703 sends out an Enable Bus signal S71 and a Phase Bus signal S72 to the logic circuit 702 based on firmware stored in the ROM 704. The logic circuit 702 controls switches of the CR motor 617, the LF motor 619, the APP motor 618, and the FB motor 623.

The logic circuit 702 generates control signals A1 to A4, B1 to B4, C1 to C4, and D1 to D4 and controls on or off of four switches of each of the H bridge circuits 705 to 708 based on the signals sent out from the voltage fall detection circuit 701 and the CPU 703. That is, the logic circuit 702 controls the drive of the CR motor 617, the LF motor 619, the APP motor 618, and the FB motor 623.

Next, by using FIG. 3A and FIG. 3B, the operation of the ink jet printer at the time of occurrence of an AC instantaneous interruption is explained. In a case where an AC instantaneous interruption occurs during printing of the ink jet printer, first, the voltage fall detection circuit 701 mounted on the control substrate 616 controls the Stop signal S1 to High (asserts the Stop signal S1). Next, the logic circuit 702 controls the switches located on the upper side in FIG. 3B to off and the switches located at the lower side in FIG. 3B to on in each of the of the H bridge circuits 705 to 708.

As a result of this, the DC power source VM, which is the output of the AC adaptor 613, and all the H bridge circuits 705 to 708 are separated. Further, on the other hand, the current of the motor that kept rotating immediately previously of the CR motor 617, the LF motor 619, the APP motor 618, and the FB motor 623 is regenerated efficiently with a low loss via the lower side switches. Because of this, it is possible to cause the motor to continue the operation at the same speed as the speed at the time of the normal operation (at a speed close to the speed at the time of the normal operation) by using the remaining kinetic energy of the motor.

Further, in a case where the AC power source (voltage) is recovered during this, it is possible to return to the operation at the normal time before the AC power source is instantaneously interrupted. In this manner, even in a case where an AC instantaneous interruption occurs, it is possible to keep the normal motor operation without causing any erroneous operation.

As a supplement, the effect in a case where the CR motor current is regenerated by an FET (Field Effect Transistor) is illustrated below.

Conditions:

| | |
|---|---|
| CR weight | m = 0.3 [kg] |
| CR speed | V = 20 [inch/s] |
| CR motor current | Im = 0.3 [A] |
| parasitic diode voltage drop | Vf = 1 [V] |
| FET on resistance | Ron = 0.2 [Ω] |
| AC instantaneous interruption time Effect | Toff = 20 [ms] |

The speed after the diode regeneration and the speed after the FET switch regeneration are compared by using a calculation expression below. Here, for simplification of calculation, other speed reduction factors, such as the torque load of the motor and friction, are ignored here.

Calculation Expression:

| | |
|---|---|
| kinetic energy | J1 = 1/2 * m * v1^2 |
| diode loss | Pd = Vf * Im |
| FET loss | Pf = Ron * Im^2 |
| kinetic energy after AC instantaneous interruption | J2 = J1 − Toff * Pd (or Pf) |
| speed after AC instantaneous interruption | v2 = √ (J2 * 2/m) |

First, the speed after the AC instantaneous interruption in a case of regeneration by a diode is calculated.

| | |
|---|---|
| kinetic energy before AC instantaneous interruption | 0.039 [J] |
| diode loss | 0.6 [W] |
| kinetic energy after loss | 0.027 [J] |
| speed after AC instantaneous interruption | 16.6 [inch/s] |

Next, the speed after the AC instantaneous interruption in a case of regeneration by an FET switch is calculated.

| | |
|---|---|
| kinetic energy before AC instantaneous interruption | 0.039 [J] |
| FET loss | 0.018 [W] |
| kinetic energy after loss | 0.038 [J] |
| speed after AC instantaneous interruption | 19.9 [inch/s] |

As described above, while a reduction in speed of 3.4 [inch/s] occurs by the diode regeneration, it is possible to suppress a reduction in speed to 0.1 [inch/s] by the FET switch regeneration.

In the embodiment described above, explanation is given by taking the ink jet printer as an example. However, it is possible to apply the embodiment to an electronic apparatus that mounts a DC motor adopting at least the above-described AC power source (example: washing machine, vacuum cleaner).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

At the time of AC instantaneous interruption, it is possible to cause the normal motor operation to continue as long as possible while relaxing a fall in the power source voltage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-086567, filed Apr. 27, 2018, which is hereby incorporated by reference wherein in its entirety.

What is claimed is:

1. An electronic apparatus comprising:
   a motor that is driven based on a current supplied from a power source;
   a detection circuit that detects an instantaneous interruption of the power source;
   a plurality of H bridge circuits each having an upper arm circuit having two switching elements connected in parallel to the power source and a lower arm circuit having two switching elements connected in parallel to a ground, the upper arm circuit and the lower arm circuit being connected, each of the plurality of H bridge circuits controlling the current to be supplied to the motor, with a diode being connected in parallel to each of the switching elements; and
   a switching control circuit that controls the switching elements for the plurality of H bridge circuits,
   wherein, in a case where the instantaneous interruption of the power source is detected by the detection circuit, the switching control circuit sets the switching elements of the upper arm circuits to off and sets the switching elements of the lower arm circuits to on, by asserting a stop signal irrespective of a level of a phase signal, whereby the current flows through the switching elements in the lower arm circuits without flowing through the diodes in the lower arm circuits, and
   wherein, in a case where a recovery to a normal state of the power source is detected by the detection circuit, the switching control circuit performs PWM control to drive the plurality of H bridge circuits based on the phase signal by negating the stop signal.

2. The electronic apparatus according to claim 1, wherein the switching control circuit fixes the switching elements of the upper arm circuit to off and the switching elements of the lower arm circuit to on in a period during in which the instantaneous interruption of the power source is detected by the detection circuit.

3. The electronic apparatus according to claim 1, further comprising:
   a control unit configured to control the electronic apparatus,
   wherein the switching control circuit switches, in a case where the instantaneous interruption of the power source is not detected by the detection circuit, the switching element to on or off based on a control signal from the control unit.

4. The electronic apparatus according to claim 3, wherein the control unit performs PWM control for the plurality of H bridge circuits in a period during which the instantaneous interruption of the power source is not detected by the detection circuit.

5. The electronic apparatus according to claim 1, wherein the detection unit detects the instantaneous interruption of the power source in a case where a voltage of the power source becomes lower than a predetermined voltage while the motor is driving.

6. The electronic apparatus according to claim 1, wherein the electronic apparatus is a printing apparatus that prints an image by driving a print head.

7. The electronic apparatus according to claim 1, wherein the motor is a DC motor.

8. A control method of an electronic apparatus, the electronic apparatus comprising:
   a motor that is driven based on a current supplied from a power source;
   a plurality of H bridge circuits each having an upper arm circuit having two switching elements connected in parallel to the power source and a lower arm circuit having two switching elements connected in parallel to a ground, the upper arm circuit and the lower arm circuit being connected, each of the H bridge circuits controlling the current to be supplied to the motor, with a diode being connected in parallel to each of the switching elements; and
   a switching control circuit that controls the switching element for the plurality of H bridge circuits,
   the control method comprising:
   detecting an instantaneous interruption of the power source; and
   setting, by the switching control circuit, in a case where the instantaneous interruption of the power source is detected, the switching elements of the upper arm circuits to off and setting the switching elements of the lower arm circuits to on by asserting a stop signal irrespective of a level of a phase signal, whereby the current flows through the switching elements in the lower arm circuits without flowing through the diodes in the lower arm circuits,
   performing, by the switching control circuit, PWM control to drive the plurality of H bridge circuits based on the phase signal by negating the stop signal in a case where a recovery to a normal state of the power source is detected by the detection circuit.

9. The control method according to claim 8, wherein the switching control circuit fixes the switching elements of the upper arm circuit to off and the switching elements of the lower arm circuit to on in a period during in which the instantaneous interruption of the power source is detected by the detection circuit.

10. The control method according to claim 8, wherein the switching control circuit switches, in a case where the instantaneous interruption of the power source is not detected by the detection circuit, the switching element to on or off based on a control signal from a control unit that is configured to control the electronic apparatus.

11. The control method according to claim 10, wherein the control unit performs PWM control for the plurality of H bridge circuits in a period during which the instantaneous interruption of the power source is not detected by the detection circuit.

12. The control method according to claim 8, wherein the detection circuit detects the instantaneous interruption of the power source in a case where a voltage of the power source becomes lower than a predetermined voltage while the DC motor is driving.

13. The control method according to claim 8, wherein the electronic apparatus is a printing apparatus that prints an image by driving a print head.

14. The method according to claim 13, wherein the motor is a DC motor.

15. A non-transitory computer readable storage medium storing a program for causing a computer to function as an electronic apparatus,
wherein the electronic apparatus comprises:
a motor that is driven based on a current supplied from a power source;
a detection circuit that detects an instantaneous interruption of the power source;
a plurality of H bridge circuits each having an upper arm circuit having two switching elements connected in parallel to the power source and a lower arm circuit having two switching elements connected in parallel to a ground, the upper arm circuit and the lower arm circuit being connected, each of the plurality of H bridge circuits controlling the current to be supplied to the motor, with a diode being connected in parallel to each of the switching elements; and
a switching control circuit that controls the switching elements for the plurality of H bridge circuits,
wherein, in a case where the instantaneous interruption of the power source is detected by the detection circuit, the switching control circuit sets the switching elements of the upper arm circuits to off and sets the switching elements of the lower arm circuits to on by asserting a stop signal irrespective of a level of a phase signal, whereby the current flows through the switching elements in the lower arm circuits without flowing through the diodes in the lower arm circuits, and
wherein, in a case where a recovery to a normal state of the power source is detected by the detection circuit, the switching control circuit performs PWM control to drive the plurality of H bridge circuits based on the phase signal by negating the stop signal.

16. The non-transitory computer readable storage medium according to claim 15, wherein the motor is a DC motor.

* * * * *